April 30, 1963
H. D. BROWN
3,088,005
VEHICLE SPEED CONTROL DEVICE
Filed Feb. 3, 1958
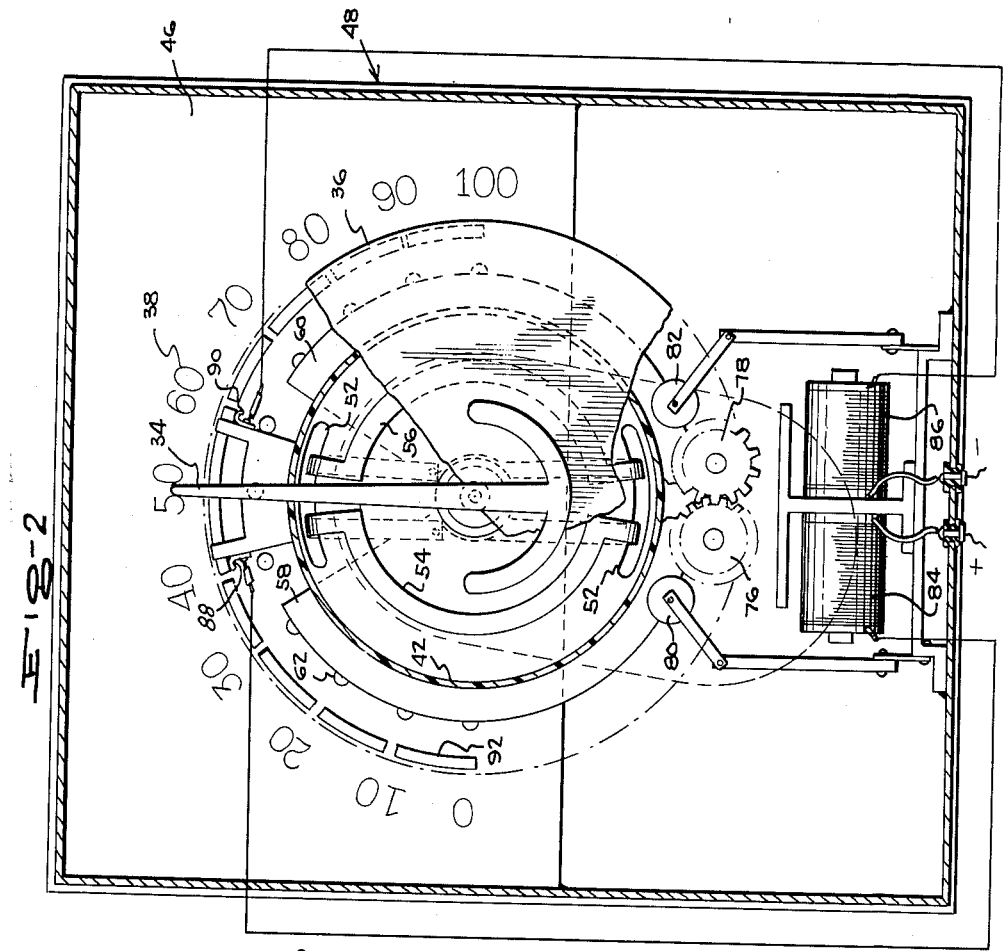
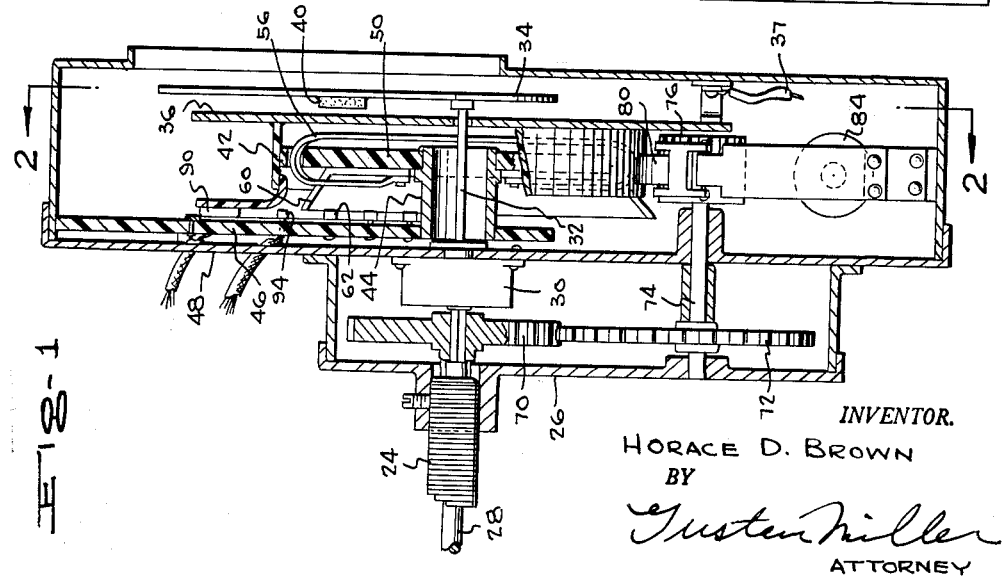
INVENTOR.
HORACE D. BROWN
BY
*Justen Miller*
ATTORNEY

United States Patent Office 3,088,005
Patented Apr. 30, 1963

3,088,005
VEHICLE SPEED CONTROL DEVICE
Horace D. Brown, 660 SW. 4th St., Miami, Fla.
Filed Feb. 3, 1958, Ser. No. 712,904
2 Claims. (Cl. 200—56)

The present invention relates to an electric switch which is actuable in response to the movements of an indicating device, such as the speed indicating needle of a speedometer.

An object of the present invention is to provide an electric switch which will respond to the movements of an indicating needle without actual physical contact with the needle, thus avoiding friction which affects the accuracy of indicating devices in which the movable indicator comes into direct contact with other physical parts for the purpose of opening or closing an electric switch.

An object of the present invention is to provide a device for controlling the speed of a vehicle which lends itself to automatic and efficient operation when installed in an automobile or other vehicle.

Another object is to provide a speed control device for a vehicle which lends itself to response to broadcast radiant energy signals as a means for selecting or setting the maximum speed for the vehicle.

A further object of the present invention is to provide a speed control device for a vehicle which lends itself to efficient, instant response, and push button control by the vehicle operator.

A still further object is to provide a speed control device for an automobile which is of simple structure, one virtually foolproof in construction and operation, and one which is economically feasible.

These and other objects and advantages of the present invention will be fully apparent from the following description when taken in conjunction with the annexed drawings, in which:

FIGURE 1 is a sectional view, on an enlarged scale;
FIGURE 2 is a sectional view, taken on the line 2—2 of FIGURE 1.

Referring to FIGURES 1 and 2, a housing 26 is shown having the speedometer cable 24 entering the back wall thereof. The rotatable core 28 of the cable 24 extends into the housing 26 and is operatively connected to a conventional speed indicating device 30 including a shaft 32 and an indicator needle 34 carried by the shaft 32 and movable therewith. The needle 34 swings over a speed indicator plate 46 having indicia 38 thereon; responsive to the speed of the automobile.

The present invention provides a permanent magnet 40 fixed to the needle 34 on the face facing the plate 36 and positioned in spaced relation with respect to the plate 46. The plate 36 is fabricated of a non-magnetic electrically conductive material, and is carried on an insulator drum 42 having one end closed by the plate 36 and having the other end open. The drum 42 is mounted by means of web 50 to be freely rotatable about a horizontal axis, between limits, on a stub shaft 44 which is arranged concentrically with respect to the shaft 32 and is fixedly secured to the insulating plate 46 mounted within a switch housing 48. The web 50 has diametrically opposed slots 52, as shown in FIGURE 2.

A pair of magnetically attractive movable spring contacts 54 and 56, each having backwardly turned end portions and a semi-circular mid portion, are secured by their ends to the web 50 on the face of the latter remote from the pointer or needle 34. As shown in FIGURE 1, the mid-portion of contact 56 is attracted forwardly when the magnet 40 is carried over the plate 36 in proximity to the adjacent part of the mid-portion of the contact 56. The contact 54 is similarly attracted into electrical contact with the plate 36 by the needle 34.

Electrically in circuit with each contact 54 and 56 is a wing contact 58 and 60, respectively, both of the latter being anchored on the web 50 and having their rims in electrical contact with one or more of a series of fixed contacts 62 projecting from the face of the plate 46. Any suitable throttling device or other apparatus may be connected to the series of fixed contacts 62, by a multiple strand cable, to operate in response to the movement of needle 34.

Referring again to FIGURES 1 and 2, a gear 70 is carried by the speedometer cable core 28 and is drivably in mesh with another gear 72 carried on a shaft 74, which is journaled in the housing 26 and projects into the housing 48. The shaft 74 carries a pinion 76 on its free end for constant rotation at variable speeds when the automobile is in motion. A second pinion 78 is in mesh with the pinion 76. Each pinion 76 and 78 has a roller portion engageable with idler rollers 80 and 82, respectively responsive to actuation of electrically actuated shift means embodying magnets 84 and 86, respectively. The rollers 80 and 82 are drawn into driving engagement with the roller portions of the pinions 76 and 78 and into simultaneous engagement with the perimeter of the drum 42 upon excitation of the associated magnets 84 and 86, respectively. The interposition of the reversely rotating pinion 78 effects the rotation of the drum 42 in one direction when the magnet 86 is energized, while energization of the magnet 84 effects the rotation of the drum 42 in the other direction.

A pair of contacts 88 and 90 are carried by the drum 42 and each is engageable with contacts in a ring of contacts 92 carried on the plate 46. The contacts 88 and 90 are connected to one end each of the magnets 84 and 86, respectively.

One end of the coil of the electromagnet 84 is connected to the positive terminal of a source of power, such as the battery of the vehicle. The other end is connected to the sliding contact 88. Similarly, one end of the coil of the electromagnet 86 is connected to the battery negative terminal and the other end is connected to the other contact 90.

In operation, as will appear to anyone skilled in the art, any one of several available means, such as a bank of self locking push-button switches, may be used for connecting one portion of the ring of contacts 92 to the positive terminal of the battery and the remainder portion to the negative terminal. The speedometer cable core 28 drives the pinion 76 when the vehicle is in motion. The contacts 88 and 90 will energize the electromagnets 84 or 86 depending upon the position of the contacts 88 and 90 with respect to the positively-connected or negatively-connected contacts in the ring 92. When the electromagnet 84 is energized, the idler roller 80 is drawn into engagement with the drum 42 and effects the rotation of the latter. When the electromagnet 86 is energized, the idler roller 82, through the interposition of the pinion 78, effects the rotation of the drum 42 in the reverse direction. As the drum 42 rotates it carries the spring contacts 54 and 56, electrically in circuit with the wing contacts 58 and 60, to the position corresponding to the speed selected by the operator of the vehicle. The magnet 40 carried by the needle 34 will draw the contact 54 into electrical engagement with the plate 36 at any position of the needle 34 until the selected speed is reached, effecting the driving of a suitable throttling device in the direction corresponding to the opening of the throttle. When the needle 34 is at a position corresponding to the selected speed, neither contact 54 nor 56 will be closed and the throttling device will be deenergized, positioning the throttle shaft at the selected speed position. Should the vehicle go faster than the selected speed the contact 56 will close on the plate 36, reversing the throttling device and repositioning the throttle shaft.

A suitable radio receiver may be employed to energize a selected number of contacts in ring 92 in response to a broadcast signal as a means of remote control of the apparatus of the present invention if desired.

Obviously, as many speed settings as may be desired may be used in a selector switch, varying the number of contacts in the ring 92 and increasing or decreasing the number of relays controlled by the said selector switch and connected to the contacts in the ring accordingly.

While only a preferred embodiment of the present invention has been shown and described, other embodiments are contemplated and numerous changes and modifications may be made herein without departing from the spirit of the invention as set forth in the following claims.

I claim:

1. In combination with a vehicle having a movable speed indicator, a speed responsive switch having at least one magnetically attractable movable switch contact and a fixed contact positioned adjacent to and in the path of movement of said movable indicator, said movable indicator carrying a magnet operable to effect the movement of said movable switch contact into engagement with said fixed contact.

2. In an electrical switch device including an indicator needle swingable in clockwise and counterclockwise directions over one face of an electrically conductive plate and about an axis normal to said plate, a magnet carried by said needle, and at least one movable magnetically attractable electrical contact positioned in spaced relation relative to the other face of said plate and connected to the latter for movement from the spaced position to a position in electrical contact with said plate responsive to attraction forces of said magnet.

References Cited in the file of this patent

UNITED STATES PATENTS

| | | |
|---|---|---|
| 616,770 | Cole et al. | Dec. 27, 1898 |
| 878,423 | Raynes | Feb. 4, 1908 |
| 926,312 | Baker | June 29, 1909 |
| 2,313,505 | Benjamin | Mar. 9, 1943 |
| 2,661,071 | Hoener | Dec. 1, 1953 |
| 2,822,881 | Treharne | Feb. 11, 1958 |
| 2,880,286 | Ferris | Mar. 31, 1959 |
| 2,897,906 | Brueder | Aug. 4, 1959 |
| 2,912,058 | Sandor | Nov. 10, 1959 |
| 2,973,414 | Bossemeyer | Feb. 28, 1961 |

FOREIGN PATENTS

| | | |
|---|---|---|
| 595,940 | Germany | Apr. 24, 1934 |
| 494,174 | Great Britain | Oct. 21, 1938 |